(12) United States Patent
Kinebuchi et al.

(10) Patent No.: US 9,554,103 B2
(45) Date of Patent: *Jan. 24, 2017

(54) PROJECTOR AND CONTROL METHOD THEREFOR

(71) Applicant: SEIKO EPSON CORPORATION, Tokyo (JP)

(72) Inventors: Tadashi Kinebuchi, Okaya (JP); Kaoru Yamaguchi, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,688

(22) Filed: Sep. 1, 2015

(65) Prior Publication Data

US 2015/0373313 A1 Dec. 24, 2015

Related U.S. Application Data

(63) Continuation of application No. 13/945,116, filed on Jul. 18, 2013, now Pat. No. 9,158,146.

(30) Foreign Application Priority Data

Jul. 23, 2012 (JP) .................................. 2012-162387

(51) Int. Cl.
*G03B 21/28* (2006.01)
*H04N 9/31* (2006.01)
(Continued)

(52) U.S. Cl.
CPC ......... *H04N 9/3179* (2013.01); *F21V 33/0052* (2013.01); *G02F 1/1334* (2013.01);
(Continued)

(58) Field of Classification Search
CPC ......... G03B 21/20; G03B 21/26; G03B 21/28; G02F 1/13342; G02F 1/133621; G02B 5/32

See application file for complete search history.

(56) References Cited

U.S. PATENT DOCUMENTS

| 5,194,973 | A | 3/1993 | Isogai et al. |
| 6,115,152 | A | 9/2000 | Popovich et al. |

(Continued)

FOREIGN PATENT DOCUMENTS

| JP | 2005-099588 A | 4/2005 |
| JP | 2006-227143 A | 8/2006 |
| JP | 2009-003356 A | 1/2009 |

*Primary Examiner* — Sultan Chowdhury
(74) *Attorney, Agent, or Firm* — Maschoff Brennan

(57) ABSTRACT

A projector can be easily attached by mounting a connecting unit to a socket for illumination in an ordinary home. Since the projector includes a communication unit configured to receive an electronic mail, the projector updates an image signal and adjusts a diffusion degree of modulated light by a light-diffusion adjusting unit on the basis of contents of the mail received by the communication unit. Therefore, when a user desires to inform family members who will return home that the user suddenly has to go out, if the user transmits in advance, to the projector, a mail including a message for a family member who returns home, the family member who returns home turns on an illumination switch at the entrance, whereby the projector can start up, perform an illuminating function, and clearly project and display the message.

10 Claims, 11 Drawing Sheets

(51) Int. Cl.
*G02F 1/1334* (2006.01)
*H04L 12/28* (2006.01)
*F21V 33/00* (2006.01)
G02F 1/1335 (2006.01)
G02B 5/32 (2006.01)

(52) U.S. Cl.
CPC ......... *G02F 1/13342* (2013.01); *G03B 21/28* (2013.01); *H04L 12/2818* (2013.01); *H04N 9/31* (2013.01); *H04N 9/317* (2013.01); *H04N 9/3111* (2013.01); *H04N 9/3155* (2013.01); *G02B 5/32* (2013.01); *G02F 1/133621* (2013.01); *G02F 2001/13347* (2013.01); *H04L 2012/285* (2013.01)

(56) References Cited

U.S. PATENT DOCUMENTS

| | | | |
|---|---|---|---|
| 6,313,894 | B1 | 11/2001 | Sekine et al. |
| 2003/0011754 | A1* | 1/2003 | Yaniv ................. G03B 21/28 353/98 |
| 2003/0058416 | A1* | 3/2003 | Safran ................. G03B 21/26 353/94 |
| 2007/0097333 | A1* | 5/2007 | Zavarehi et al. ...... G03B 21/20 353/85 |
| 2009/0167966 | A1 | 7/2009 | Nam et al. |
| 2009/0290127 | A1* | 11/2009 | Kobayashi et al. .. H04N 5/7416 353/30 |
| 2010/0253618 | A1 | 10/2010 | Nishigaki et al. |

* cited by examiner

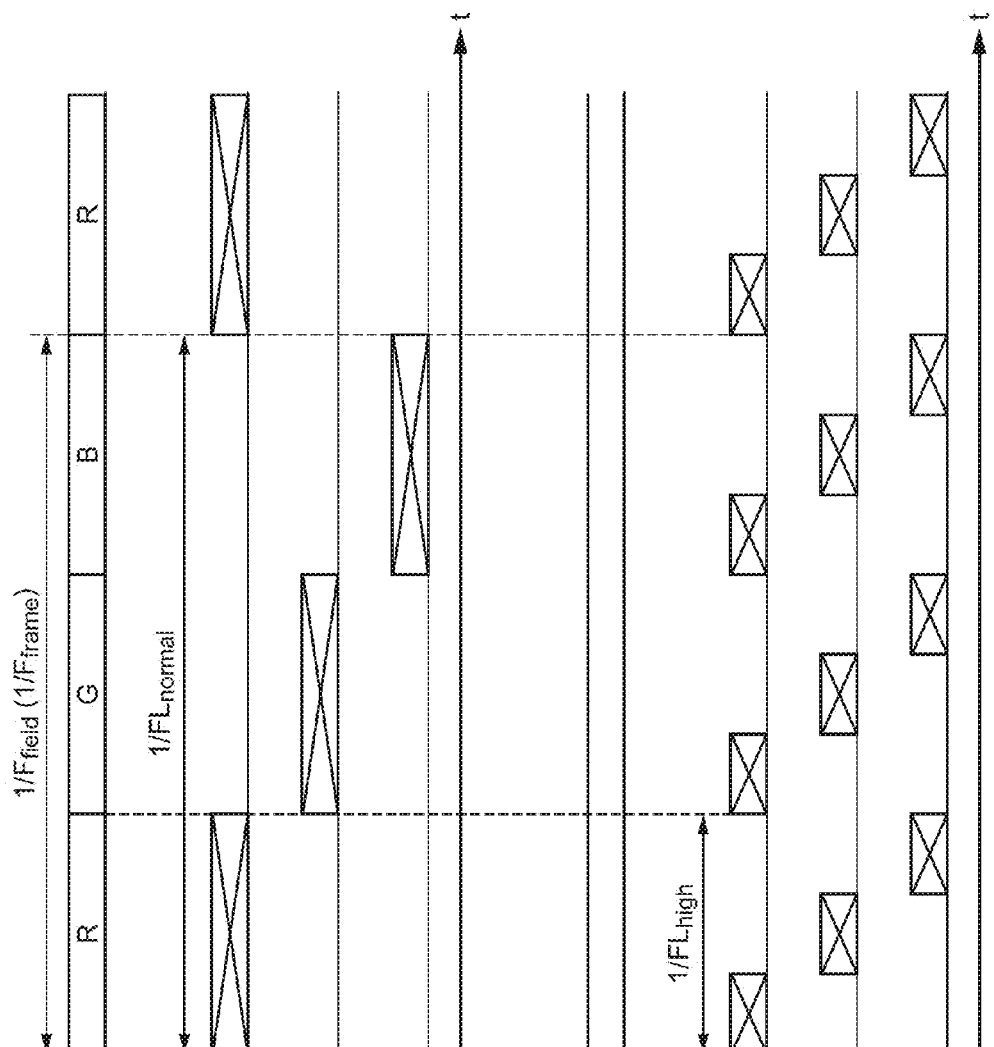

PROJECTOR AND CONTROL METHOD THEREFOR

This application is a Continuation of U.S. application Ser. No. 13/945,116, filed Jul. 18, 2013 which claims priority to Japanese Patent Application No. 2012-162387, filed Jul. 23, 2012. The foregoing patent applications are incorporated herein by reference.

BACKGROUND

1. Technical Field

The present invention relates to a projector that can function as lighting equipment and a control method for the projector.

2. Related Art

In a company, a public office, or the like, staff members often hold a meeting for a large number of people while projecting materials on a wall surface or the like of a meeting room using a projector. In such a meeting, for example, when data of a prepared material is wrong, the staff members sometimes desire to replace the material in a hurry. For example, JP-A-2009-3356 (Patent Literature 1) discloses a technique suitable for such a situation. Specifically, a receiving function or the like is added to the projector, whereby, when an emergent electronic mail is received, a material attached to the electronic mail is projected instead of a projected material.

JP-A-2005-99588 (FIG. 6) (Patent Literature 2) and JP-A-2006-227143 (Patent Literature 3) propose a projector including a component (a plug) for mounting (fixing) the projector to a socket for lighting equipment and capable of switching an illuminating function and a video projecting function using electric power received from the socket.

However, the technique disclosed in Patent Literature 1 is based on the premise that the projector is used in the meeting room of the company where the projector is set. Therefore, a scene of usage is limited. In particular, in ordinary homes, many families do not own the projector itself and do not have an opportunity for using the technique. Therefore, versatility of the technique is poor.

On the other hand, with the technique proposed by Patent Literatures 2 and 3, by mounting the projector to the socket for lighting equipment, the illuminating function and the projecting function can be switched. However, there is no description concerning a specific method, for example, in what kinds of situations the two functions are switched (properly used). Therefore, it is difficult to effectively utilize the two functions.

SUMMARY

An advantage of some aspects of the invention is to solve at least the problems described above, and the invention can be implemented as the following application examples or forms.

Application Example 1

This application example is directed to a projector including: a connecting unit for mounting the projector to a socket for lighting equipment; a light source configured to emit light with electric power supplied to the connecting unit; a light modulating unit configured to convert the light emitted by the light source into modulated light specified by an image signal; a diffusion adjusting unit configured to adjust a diffusion degree of the light made incident on the light modulating unit or the light emitted from the light modulating unit; a communication unit configured to receive predetermined information via a communication network; and a control unit configured to update the image signal and control the adjustment of the diffusion degree by the diffusion adjusting unit on the basis of contents of the predetermined information received by the communication unit.

With this configuration, for example, by mounting the connecting unit to a socket for lighting equipment set in an entrance hall of an ordinary home, the projector that can also function as lighting equipment can be easily attached. The projector includes a communication unit configured to receive predetermined information such as an electronic mail. The projector can update the image signal and adjust the diffusion degree using the diffusion adjusting unit on the basis of contents of the predetermined information received by the communication unit.

Therefore, for example, when a user desires to inform family members who will return home that the user suddenly has to go out, if the user transmits in advance, to the projector, an electronic mail including a message for a family member who returns home, the family member who returns home turns on an illumination switch at the entrance, whereby the projector can start up, perform the illuminating function, and clearly project and display the message. Therefore, it is possible to effectively utilize the illuminating function for illuminating the entrance hall and the projecting function for displaying the message. In other words, it is possible to provide the projector that can effectively utilize the illuminating function and the projecting function and has high versatility.

In the projector of the application example, it is preferable that the control unit switches, on the basis of the contents of the predetermined information, an illumination mode for causing the diffusion adjusting unit to diffuse the light and a projection mode in which the diffusion degree is lower than the diffusion degree in the illumination mode.

In the projector of the application example, it is preferable that, when content for display is included in the received predetermined information, the control unit superimposes the content on the image signal and sets the diffusion degree to the projection mode.

In the projector of the application example, it is preferable that, when content is included in the received predetermined information, the control unit superimposes, on the image signal, an image indicating that the content is being read before performing superimposition of the content.

In the projector of the application example, it is preferable that, when a link to content is included in the predetermined information, the content is read from the link destination via the communication network.

In the projector of the application example, it is preferable that the projector further includes a storing unit configured to store setting data including an image signal used in the illumination mode, and, when electric power is supplied to the connecting unit, the control unit causes, on the basis of the setting data, the light modulating unit to modulate the light emitted by the light source.

In the projector of the application example, it is preferable that the setting data includes the image signal including an image having a gradation of tones.

In the projector of the application example, it is preferable that the setting data includes, in addition to the image signal, at least one of diffusion degree data representing the diffusion degree of the diffusion adjusting unit, an identifier for designating the illumination mode or the projection mode, illumination color data designating an illumination color in the illumination mode, and time data designating duration of the illumination mode or the projection mode.

In the projector of the application example, it is preferable that the diffusion adjusting unit includes a PDLC device or a reverse mode PDLC device.

In the projector of the application example, it is preferable that the diffusion adjusting unit includes a focus adjusting lens or a diffuser configured to transmit and diffuse the light.

Application Example 2

This application example is directed to a control method for a projector including: a connecting unit for mounting the projector to a socket for lighting equipment; a light source configured to emit light with electric power supplied to the connecting unit; a light modulating unit configured to convert the light emitted by the light source into modulated light specified by an image signal; a diffusion adjusting unit configured to adjust a diffusion degree of the light made incident on the light modulating unit or the light emitted from the light modulating unit; and a communication unit configured to receive predetermined information via a communication network, the control method including: allowing the communication unit to receive the predetermined information; and updating the image signal and controlling the adjustment of the diffusion degree by the diffusion adjusting unit on the basis of contents of the predetermined information received by the communication unit.

BRIEF DESCRIPTION OF THE DRAWINGS

The invention will be described with reference to the accompanying drawings, wherein like numbers reference like elements.

FIG. 6A is a driving timing chart in a normal mode.

FIG. 6B is a driving timing chart in a high-speed mode.

DESCRIPTION OF EXEMPLARY EMBODIMENTS

Figure 1:
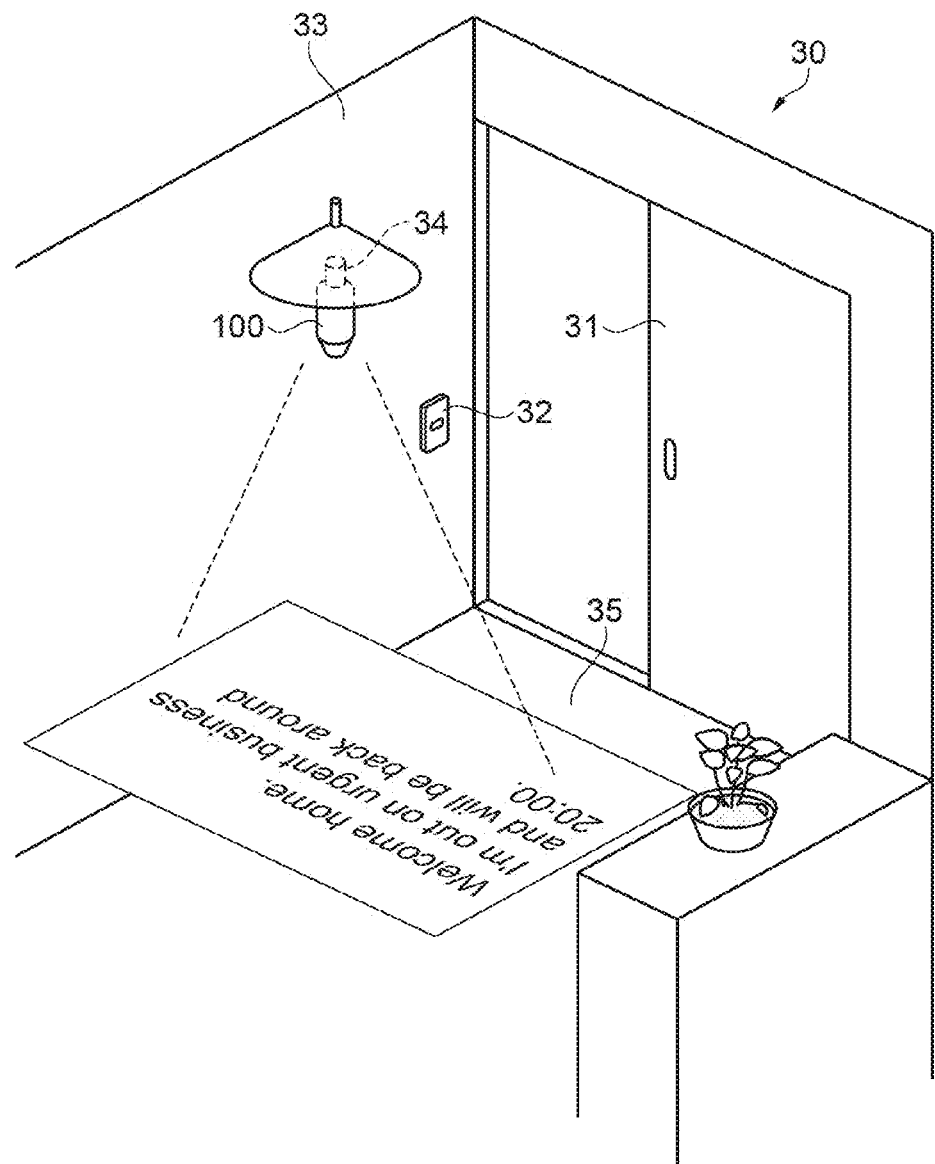
FIG. 1 is a diagram of a form of a usage scene of a projector according to a first embodiment.

Embodiments of the invention are explained below with reference to the drawings. In the drawings referred to below, scales of layers and regions are set different from actual scales in order to show the layers and the regions in sizes recognizable on the drawings.

First Embodiment

Overview of a Projector Usage Scene

FIG. 1 is a diagram of a form of a usage scene of a projector according to a first embodiment. First, an example of a usage scene of a projector 100 according to this embodiment is explained.

The projector 100 is a projector that can be attached to a socket for illumination set in an ordinal home. In the example shown in FIG. 1, a connecting unit (a plug) of the projector 100 is fixed to a socket 34 for lighting equipment (a lighting fixture) set on a ceiling 33 of an entrance hall 30. The projector 100 can switch an illumination mode in which the projector 100 functions as the lighting equipment (the lighting fixture) and a projection mode in which the projector 100 functions as a projector. A specific configuration, a switching method for the two modes, and the like are explained below.

FIG. 1 shows a situation in which, when a family member returns to the house where the family is out at night, the family member turns on an illumination switch 32 for an entrance hall, whereby a message left by another family member is projected on a floor 35 of the entrance hall 30 by the projector 100. On a projection screen (a floor surface), "Welcome home. I'm out on urgent business and will be back around 20:00." This is because the family member (e.g., a wife), who had to suddenly go out, transmitted a message for the family member (e.g., a husband), who returned home at night, to the projector 100 by electronic mail (hereinafter referred to as "mail").

Initial setting for the projector 100 is the illumination mode. When the illumination switch 32 is turned on, illumination is started. At this point, if content included in a received mail (predetermined information) is a message mainly including a text, the illumination mode is switched to message display in about a few seconds. Therefore, it is possible to transmit a message while the family member locks a door 31 or takes off shoes. In particular, when the illumination mode is switched to the projection mode, since the brightness and the color tone of illumination change, it is possible to cause the family member to physically (visually) recognize the presence of the message. In the projection mode, as in the illumination mode, illuminance sufficient for the family member to recognize an object around the family member at night is secured.

Configuration of the Projector

Figure 2:
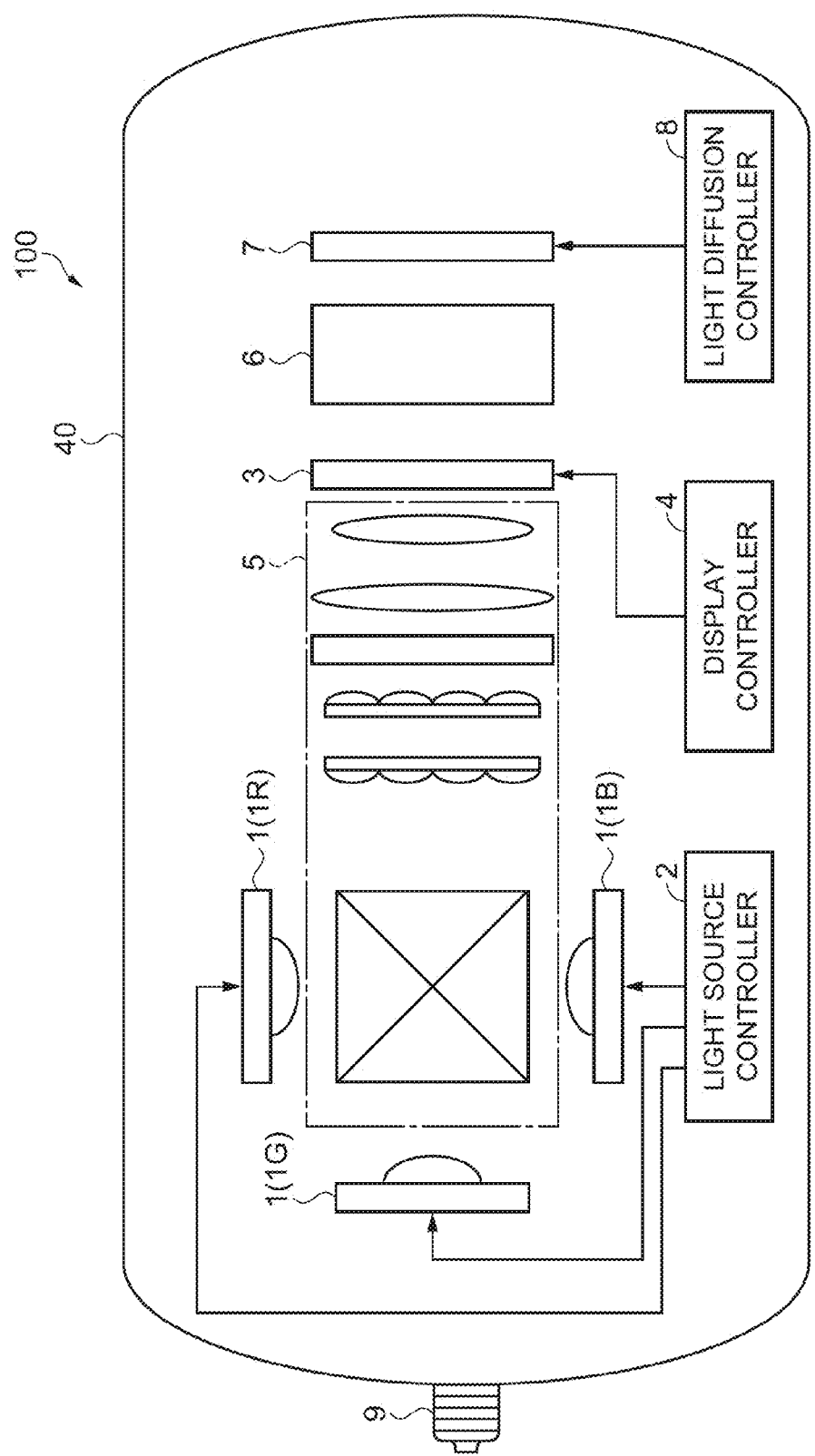
FIG. 2 is a schematic configuration diagram of the projector mainly including an optical system.
Figure 3:
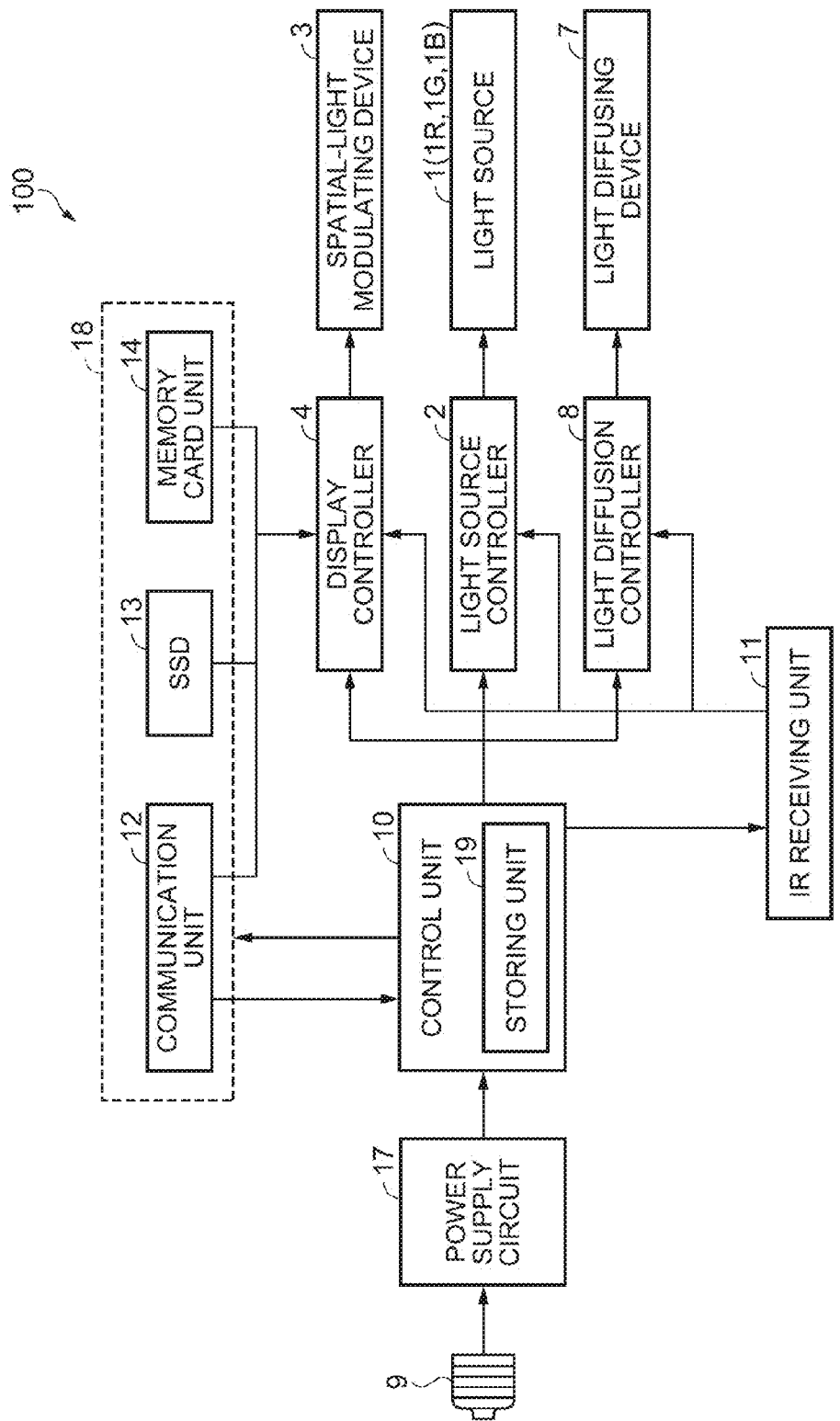
FIG. 3 is a schematic configuration block diagram of the projector.

FIG. 2 is a schematic configuration diagram of the projector mainly including an optical system. FIG. 3 is a schematic configuration block diagram of the projector. The configuration of the projector 100 for realizing the functions explained above is explained.

As shown in FIG. 2, the projector 100 assumes a configuration in which a connecting unit 9 functioning as a plug (a cap) is attached to one end (surface) of a substantially cylindrical case 40. In other words, the projector 100 is formed in an external appearance of a rather long (elongated) electric bulb. The projector 100 is not limited to this shape. The projector 100 may be formed in any shape as long as the case 40 and the connecting unit 9 are integrally formed. For example, the projector 100 may be a spherical body, may be a polygonal body, or may be a solid body obtained by combining the spherical body and the polygonal body.

The connecting unit 9 is a power receiving terminal (a plug) screwed into and fixed to a cap socket, which is an example of a power supply terminal for lighting equipment, and configured to receive the supply of electric power from the cap socket. The electric power supplied to the connecting unit 9 may be either an alternating current or a direct current. The connecting unit 9 may be a plug connected to a receptacle functioning as a power supply terminal.

The projector 100 includes a light source 1, a light source controller 2 configured to drive the light source 1, a spatial-light modulating device 3 configured to modulate light emitted from the light source 1, a display controller 4 configured to write an image in the spatial-light modulating device 3, an irradiation optical system 5 provided to irradiate the light from the light source 1 on the spatial-light modulating device 3, a projection optical system 6 configured to project the light modulated by the spatial-light modulating device 3, a light diffusing device 7 configured to adjust a diffusion degree of the light projected by the projection optical system 6, and a light diffusion controller 8 configured to control the light diffusing device 7 and the like. The light source unit is configured by the light source 1 and the light source controller 2. A light modulating unit is configured by the spatial-light modulating device 3 and the display controller 4. A diffusion adjusting unit is configured by the light diffusing device 7 and the light diffusion controller 8.

As shown in FIG. 3, the projector 100 further includes a control unit 10, a power supply circuit 17, an IR receiving unit 11, and an interface unit 18 and the like.

The control unit 10 is an MCU (Micro Controller Unit). The control unit 10 controls the units such as the light source controller 2, the display controller 4, the light diffusion controller 8, the IR receiving unit 11, and the interface unit 18. A storing unit 19 is attached to the control unit 10. The storing unit 19 includes a nonvolatile memory including a flash memory, a ROM, and a RAM. The nonvolatile memory has stored therein various programs for controlling the operation of the projector 100 including a program specifying order and contents for performing the illumination mode and the projection mode and data accompanying the programs. The programs also include a driving program for switching the illumination mode and the projection mode according to presence or absence of reception of predetermined information (a mail, etc.) and contents of setting data included in the predetermined information. The accompanying data includes setting data for initial illumination including an image signal in an initial illumination mode, diffusion degree data, and driving mode data specifying a driving frequency in sequential driving of a light source and a plurality of setting data set for each of usage scenes such as setting data for a party and setting data for relaxation. The ROM has stored therein a BIOS.

The power supply circuit 17 is an AC conversion circuit configured to convert alternating-current power supplied to the connecting unit 9 into direct-current power. The power supply circuit 17 includes a transforming circuit, a rectifying circuit and a stabilizing power supply circuit such as a switching regulator. When electric power supplied to the connecting unit 9 is a direct current, the transforming circuit and the rectifying circuit are unnecessary. The power supply circuit 17 also functions as a detecting unit configured to detect that electric power is supplied to the connecting unit 9.

The IR receiving unit 11 is a light receiving unit configured to receive an operation signal by an infrared ray received from a remote controller (not shown in the figure) for remotely controlling the projector 100. The interface unit 18 is configured by a communication unit 12, an SSD 13, a memory card unit 14, and the like.

The communication unit 12 is a wireless LAN adapter. The communication unit 12 can receive predetermined information such as a mail transmitted from an external network (not shown in the figure) to the projector 100. The communication unit 12 realizes a function of an actual communication unit by forming a pair with the control unit 10 that assumes a function for identifying and analyzing predetermined information out of communication data received by the communication unit 12. With such a communication unit (the pair of the control unit 10 and the communication unit 12), it is also possible to access a server computer, a personal computer, a smart phone, or a tablet computer on the outside (all of which are not shown in the figure) via an external network and read out image data, moving image data, and the like.

The SSD 13 is a flash memory drive device. The memory card unit 14 includes a card slot for a memory card and an I/O (Input/Output) circuit. An image to be projected by the projector 100 is stored in a memory card (not shown in the figure) inserted into the card slot. The stored image can be rewritten through the external network by the function of the communication unit 12.

In this specification, "image" is defined as a term including a still image and a moving image. The still image includes a still image that changes with time such as a slide show and may involve sound. "Image" sometimes means a displayed or projected still image or moving image itself or sometimes means data (including streaming data) for displaying or projecting the still image or the moving image.

Referring back to FIG. 2, the light source 1 includes an LED corresponding to R (red light), an LED corresponding to G (green light), and an LED corresponding to B (blue light). In the following explanation, the light source 1 is represented as RGB light sources 1R, 1G, and 1B as well. R, G, and B are an example of a combination of typical element colors for displaying a full color. Therefore, the light source 1 in this embodiment includes three LEDs corresponding to three different element colors. However, in other embodiments, the light source 1 may include LEDs corresponding to four or more different element colors or may include LEDs corresponding to two different element colors. The light source 1 may include, instead of the LEDs, organic or inorganic semiconductor lasers or organic EL (electroluminescent) elements or may include phosphors, excitation light sources of which are LEDs or lasers. In the following explanation, light synthesized by the light sources 1R, 1G, and 1B is referred to as "illumination light". A color tone of the illumination light is referred to as "illumination color". The illumination color is specified by illumination color data of setting data.

The irradiation optical system 5 includes a dichroic prism configured to combine optical paths of color lights from the respective RGB light sources 1R, 1G, and 1B, an integrator including a fly-eye lens, and a polarization conversion element configured to align polarized lights of lights from the integrator into one light.

The spatial-light modulating device 3 in this embodiment is a single-panel transmissive liquid crystal light valve. A liquid crystal light valve in this context includes a pair of sheet polarizers and a liquid crystal panel located between the pair of sheet polarizers. As a preferred example, the RGB light sources 1R, 1G, and 1B and the spatial-light modulating device 3 are driven by an RGB sequential system, i.e., a color sequential system. Consequently, the projector 100 can project full-color illumination or image.

The light diffusing device 7 is located on an optical path of light projected by the projection optical system 6. The light diffusing device 7 includes a transmissive reverse mode PDLC device. PDLC refers to polymer-dispersed liquid crystal. Although not shown in the figure, the reverse mode PDLC device includes a pair of electrodes having optical transparency and a reverse mode PDLC layer located between the pair of electrodes. When there is no potential difference between the pair of electrodes, the reverse mode PDLC layer assumes optical transparency. As a result, light is transmitted through the light diffusing device 7 without being substantially diffused. The light diffusing device 7 at this point is expressed as being in a non-diffusing state. On the other hand, when a predetermined potential difference is given between the pair of electrodes, the reverse mode PDLC layer assumes optical diffusibility. As a result, the light is diffused and transmitted through the light diffusing device 7. The light diffusing device 7 at this point is expressed as being in a diffusing state. Further, when the potential difference given between the pair of electrodes is an intermediate potential difference between 0 and a predetermined potential difference, the reverse mode PDLC layer assumes intermediate optical diffusibility corresponding to the potential of the reverse mode PDLC layer. As a result, the light is moderately diffused and transmitted through the light diffusing device 7. The light diffusing device 7 at this point is expressed as being in an intermediate diffusing state. In this way, the light diffusing device 7 can adjust a diffusion degree of an image or illumination projected by the projector 100.

Transparency obtained when the reverse mode PDLC layer assumes the optical transparency is higher than transparency obtained when a normal PDLC layer assumes the optical transparency. This is one of advantages realized when the light diffusing device 7 includes the reverse mode PDLC layer (or the reverse mode PDLC device). The term "PDLC" is defined to include both "reverse mode PDLC" and normal "PDLC".

Operation of the Projector

Figure 4:
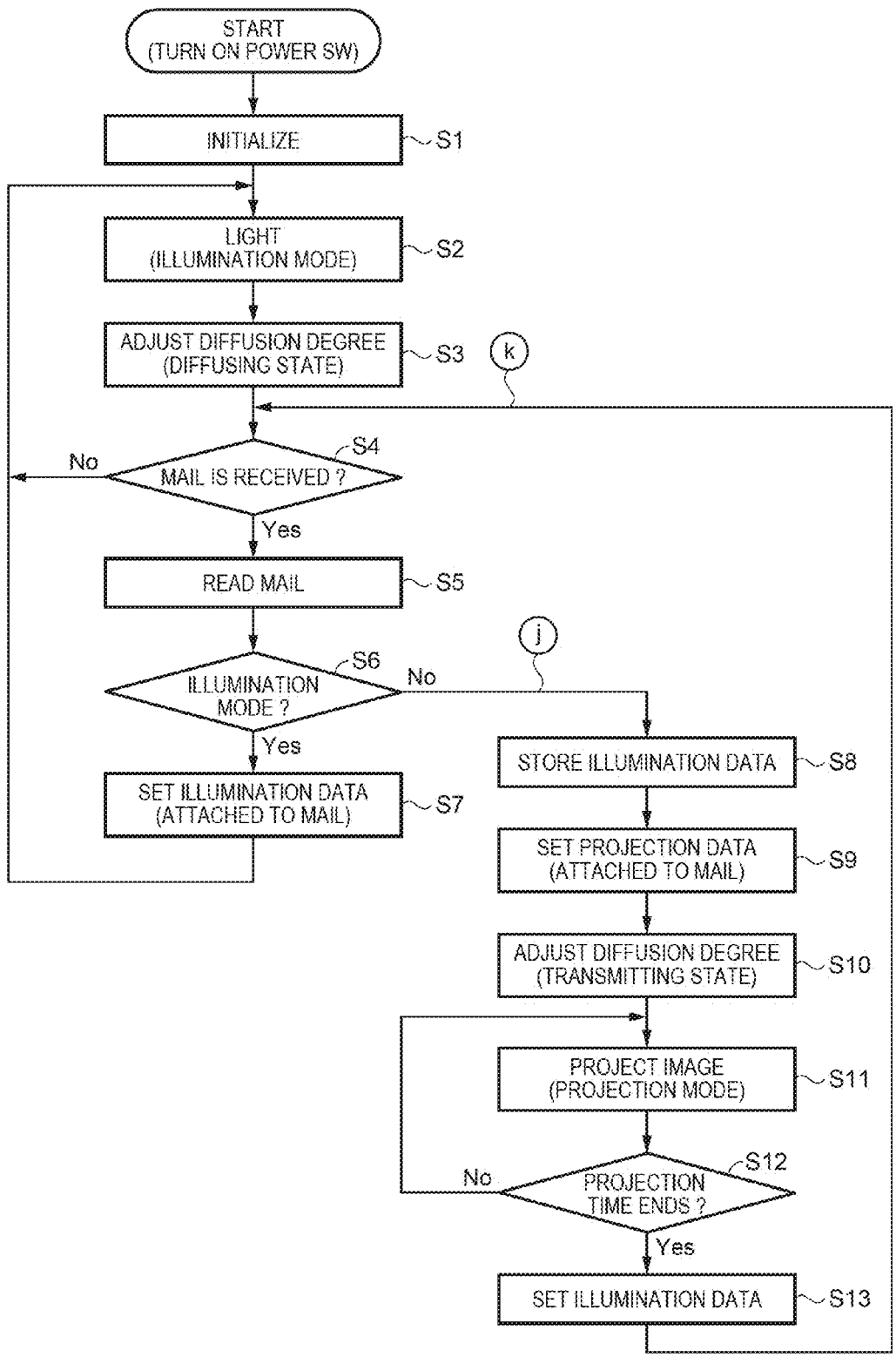
FIG. 4 is a flowchart for explaining a flow of a control method for the projector.

FIG. 4 is a flowchart for explaining a flow of a control method for the projector. A flow of a driving method including the switching of the "illumination mode" and the "projection mode" described above is explained mainly with reference to FIG. 4 and with reference to FIGS. 1 and 3 as well. The flow is executed by the control unit 10 controlling the units including the communication unit 12 on the basis of the driving program stored in the storing unit 19.

First, the illumination switch 32 is pushed to be turned on and electric power is supplied to the connecting unit 9.

In step S1, initialization of the units is performed. Specifically, electric power is supplied from the power supply circuit 17 to the units including the control unit 10 and the communication unit 12 to start up the units. Subsequently, the control unit 10 reads out the setting data for initial illumination from the storing unit 19, sets initial driving mode data for a light source in the light source controller 2, and sets initial image signal data in the display controller 4. Further, the control unit 10 sets initial diffusion degree data in the light diffusion controller 8. In this embodiment, the initial setting data is set in the illumination mode.

In step S2, the control unit 10 executes lighting in the illumination mode specified by the setting data for initial illumination. Specifically, the control unit 10 drives to light the RGB light sources 1R, 1G, and 1B to synthesize white light at a driving frequency of a "high-speed mode" explained later and displays a solid image on the spatial-light modulating device 3. A color of illumination is not limited to white and may be other colors (e.g., orange).

In step S3, the control unit 10 adjusts a light diffusion degree of the light diffusing device 7 to the illumination mode. Specifically, the control unit 10 adjusts the light diffusion degree to a diffusion degree at which the outer edge of projected light is blurred. To facilitate understanding of the explanation, the two steps S2 and S3 are dividedly explained. However, actually, the two steps are substantially simultaneously performed as a pair.

In step S4, the control unit 10 determines whether a mail (predetermined information) is received. Specifically, the control unit 10 checks whether a mail is included in communication data received through the communication unit 12. When a mail is included in the communication data (Yes in S4), the control unit 10 proceeds to step S5. When a mail is not included in the communication data (No in S4), the control unit 10 returns to step S2 and continues the lighting in the illumination mode of the initial setting. In this embodiment, a mail is used as an example of the predetermined information. However, other communication data such as a control command or packet data including an identifier may be used.

In step S5, the control unit 10 checks and analyzes contents of the received mail. Specifically, the control unit 10 reads setting data out of the contents of the mail. The setting data includes an identifier for identifying the illumination mode or the projection mode, driving mode data, image signal data, and a message and the like.

In step S6, the control unit 10 determines whether the received mail instructs the illumination mode. Specifically, the control unit 10 checks whether the identifier for selecting the illumination mode or the projection mode is 0 or 1. When the received mail instructs the illumination mode (Yes in S6), the control unit 10 proceeds to step S7. When the received mail does not instruct the illumination mode (No in S6), the control unit 10 proceeds to step S8.

In step S7, the control unit 10 sets the setting data designated by the received mail in the units. Specifically, the control unit 10 sets the driving mode data in the light source controller 2 and sets the image signal data in the display controller 4. The control unit 10 sets the diffusion degree data in the light diffusion controller 8. When the setting of the setting data designated by the received mail ends, the control unit 10 proceeds to step S2 and executes lighting in the illumination mode according to the setting data.

In step S8, the control unit 10 stores the setting data in the illumination mode being executed. This is for the purpose of storing, before switching the illumination mode to the projection mode, the setting data being executed. In this step, since lighting is sometimes performed according to setting data different from the setting data for initial illumination, it is possible to reuse the setting data by leaving the setting data in the storing unit 19.

In step S9, the control unit 10 sets the setting data for the projection mode designated by the received mail in the units. Specifically, the control unit 10 sets the driving mode data in the light source controller 2 and sets the image signal data in the display controller 4. The control unit 10 sets the diffusion degree data in the light diffusion controller 8. It is obvious that the setting data for the projection mode is described in the mail treated in this step.

In step S10, the control unit 10 adjusts the light diffusion degree of the light diffusing device 7 to the projection mode. Specifically, the control unit 10 adjusts the diffusion degree to be lower than a diffusion degree in the illumination mode for performing lighting for illumination and to be substantially zero (a state in which the light is transmitted without being substantially diffused). Consequently, for example, even when characters are included in a projected image, deformation of the characters is reduced and the characters are clearly displayed.

In step S11, the control unit 10 executes projection specified by the setting data for the projection mode of the received mail. Specifically, the control unit 10 drives to light the RGB light sources 1R, 1G, and 1B at a driving frequency of a "normal mode" explained below and displays the message and the image designated by the mail on the spatial-light modulating device 3. To facilitate understanding of the explanation, the two steps S10 and S11 are dividedly explained. However, actually, the two steps are substantially simultaneously performed as a pair.

In step S12, the control unit 10 determines whether a projection time designated by the setting data of the received mail ends. When the projection time ends (Yes in S12), the control unit 10 proceeds to step S13. When the projection time does not end (No in S12), the control unit 10 returns to step S11.

In step S13, the control unit 10 sets the setting data for the illumination mode stored in step S8 in the units again. Specifically, the control unit 10 sets the driving mode data in the light source controller 2 and sets the image signal data in the display controller 4. The control unit 10 sets the diffusion degree data in the light diffusion controller 8. When the setting of the setting data for the illumination mode ends, the control unit 10 proceeds to step S4 and checks whether a new received mail is present. Even when the projection time ends in step S12, the control unit 10 continues the lighting in the projection mode in step S11 until the next lighting (projection) begins. Consequently, it is possible to perform the projection (lighting) without a break. In this embodiment, as a preferred example, after the projection time ends, the projection mode is returned to the illumination mode (the setting data) immediately before the projection mode. However, the projection mode may be returned to the illumination mode for initial illumination.

Contents of a Received Mail

Figure 5A:
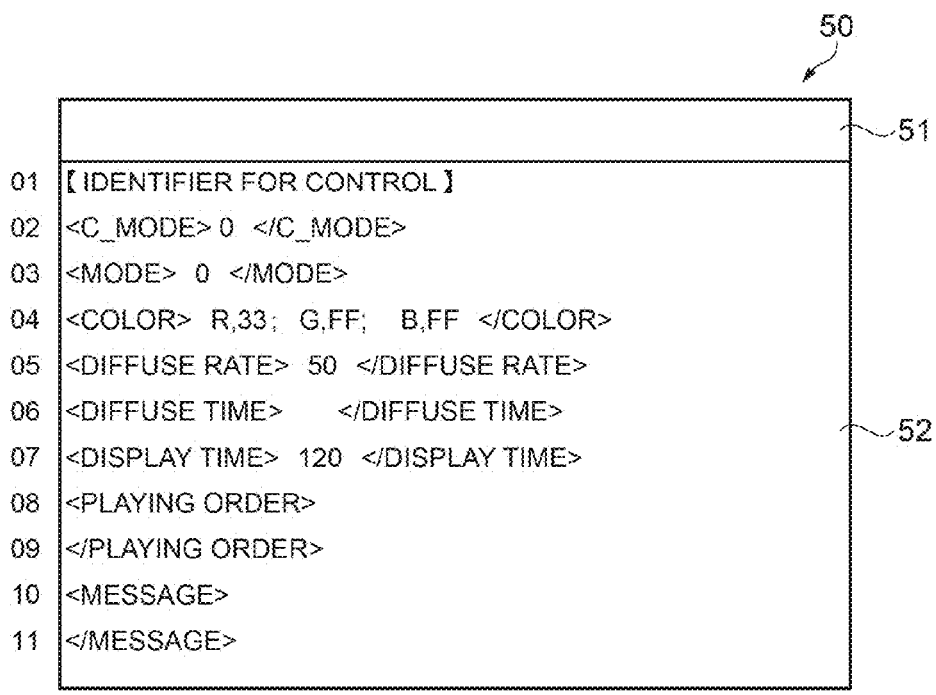
FIGS. 5A and 5B are diagrams showing examples of a mail for operation instruction for the projector.
Figure 5B:
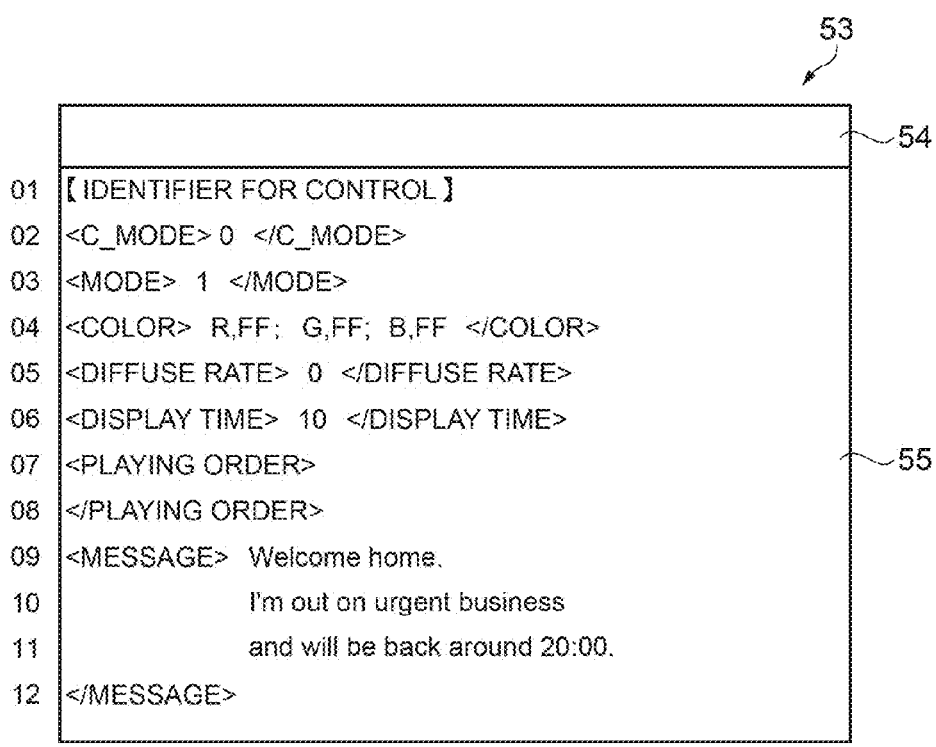

FIGS. 5A and 5B are examples of operation instruction mails of the projector 100. The examples of the operation instruction mails of the projector 100 are explained.

A mail 50 shown in FIG. 5A is configured by a header 51 and content 52. The setting data explained above is described in the content 52. The data is not limited to be described in the content 52. The data may be described in the header 51 or may be described in both the content 52 and the header 51.

In a second row of the content 52, a C mode is set. Specifically, "0" described in a setting region of the C mode is an identifier. This indicates that processing is advanced in a normal flow. The setting region means a region between <C_MODE> and </C_MODE>. Concerning the following modes and data, likewise, a region between <**> and </**> is a setting region. The C mode is explained in the second embodiment.

In a third row, the illumination mode or the projection mode is set. Specifically, "0" described in a setting region for a mode is an identifier. This indicates the "illumination mode". An identifier "1" indicates the "projection mode".

In a fourth row, illumination color data specifying an illumination color synthesized by the light sources 1R, 1G, and 1B is described. Specifically, "R,33;G,FF;B,FF" described in a setting region for data is the illumination color data. In this case, a "bright light blue" is synthesized. In the case of this mail, setting of the "normal mode" and the "high-speed mode" in the sequential driving is linked with the setting of the illumination mode or the projection mode in the third row. Specifically, designation of the illumination mode is set in association with the "high-speed mode" and designation of the projection mode is set in association with the "normal mode".

In a fifth row, diffusion degree data is described. Specifically, "50" described in a setting region for data is the diffusion degree data. In this case, the diffusion degree data is set to a diffusion degree "50%".

In a sixth row, a diffusion time is described. In this mail, the sixth row is a blank. In this case, the diffusion time is set to be synchronized with a display time in the next row.

In a seventh row, a display time is described. Specifically, "120" described in a setting region for data is time data. In this case, "120 minutes" is the display time. When a power switch is turned off, even if the display time is less than a set time, display is forcibly finished.

In eighth and subsequent rows, display content is designated. The display content includes an image such as a photograph, a moving image, a message by text, and a link to a moving image (content) and the like. First, in the eighth and ninth rows, image data (display content) desired to be projected such as a photograph (an image) or a moving image is attached. In this mail, nothing is attached. In this case, the image data is a plain white (255 tone) image.

In the tenth and eleventh rows, a message (a text) is described as display content. In this mail, nothing is attached. In this case, the image data is a plain white image. Lighting by such setting data is plain bright light blue illumination.

Subsequently, illumination setting data of a mail 53 shown in FIG. 5B is explained. Only differences from the explanation in FIG. 5A are explained. The mail 53 is configured by a header 54 and content 55. The illumination setting data is described in the content 55.

First, a difference from the mail 50 is that an identifier of a mode in a third row in the content 55 is "1" and the "projection mode" is set. Second, illumination color data in a fourth row is "R,FF;G,FF;B,FF". In this case, "white light" is synthesized. Diffusion degree data in a fifth row is "0". In this case, a diffusion degree is set to "0%". A sharp image is displayed.

In seventh and subsequent rows, display content is designated. Nothing is attached in the seventh and eighth rows. In the ninth to eleventh rows, a message (display content) "Welcome home. I'm out on urgent business and will be back around 20:00." is described. According to this instruction, the display controller 4 generates an image signal obtained by superimposing the message on a plain image signal. The spatial-light modulating device 3 displays an image in which only a character portion is black (0 tone). In projection by such setting data for the projection mode, as shown in FIG. 1, the message with black characters is clearly displayed in white illumination. In this example, since a character color is not designated, standard black is applied. However, a command for designating the character color can also be added.

It is desirable to make it possible to easily create these mails by inputting the mails in a dedicated mail form using a GUI in a PC or a smart phone installed with a dedicated application program.

Driving Modes for the Light Sources

FIG. 6A is a driving timing chart in the normal mode. FIG. 6B is a driving timing chart in the high-speed mode. As explained above, the sequential driving for the RGB light sources is controlled to be the normal mode in the projection mode and controlled to be the high-speed mode in the illumination mode. Details of the driving modes for the light sources are explained.

Normal Mode

As shown in FIG. 6A, in the RGB sequential driving or the color sequential driving, one frame of a frame color is represented by temporally continuous three field images. When double speed driving is not performed, if a frame frequency $F_{frame}$ of a source image is 60 Hz, an RGB repetition frequency $F_{field}$ of a field image is 60 Hz. For example, in the case of triple speed driving, if the frame frequency $F_{frame}$ of the source image is 60 Hz, the RGB repetition frequency $F_{field}$ of the field image is 180 Hz. When the RGB light sources 1R, 1G, and 1B are driven in the normal mode, R, G, and B LEDs are sequentially repeatedly driven to correspond to RGB field images. At this point, a repetition frequency $FL_{normal}$ of the RGB light sources 1R, 1G, and 1G is 60 Hz (in the case of the triple speed driving, 180 Hz). That is, in the normal mode, the RGB repetition frequency $F_{field}$ of the field image and the repetition frequency $FL_{normal}$ of the sequentially driven RGB light sources 1R, 1G, and 1B are the same. The number of element colors and the number of element light sources may be larger than three.

High-Speed Mode

As shown in FIG. 6B, a repetition frequency $FL_{high}$ of the RGB light sources 1R, 1G, and 1B in the case of the high-speed mode is higher than the RGB repetition frequency $F_{field}$ of the field image written in the spatial-light modulating device 3 in the case of the normal mode.

Naturally, when the normal mode and the high-speed mode are defined, the normal mode and the high-speed mode may be simply represented by the levels of the repetition frequencies $FL_{normal}$ and $FL_{high}$ in the modes of the RGB light sources 1R, 1G, and 1B. The repetition frequency $FL_{high}$ in the high-speed mode is higher than the repetition frequency $FL_{normal}$ in the normal mode. In this embodiment, the repetition frequency $FL_{high}$ in the high-speed mode is three times as high as the repetition frequency $FL_{normal}$ in the normal mode.

Figure 7:
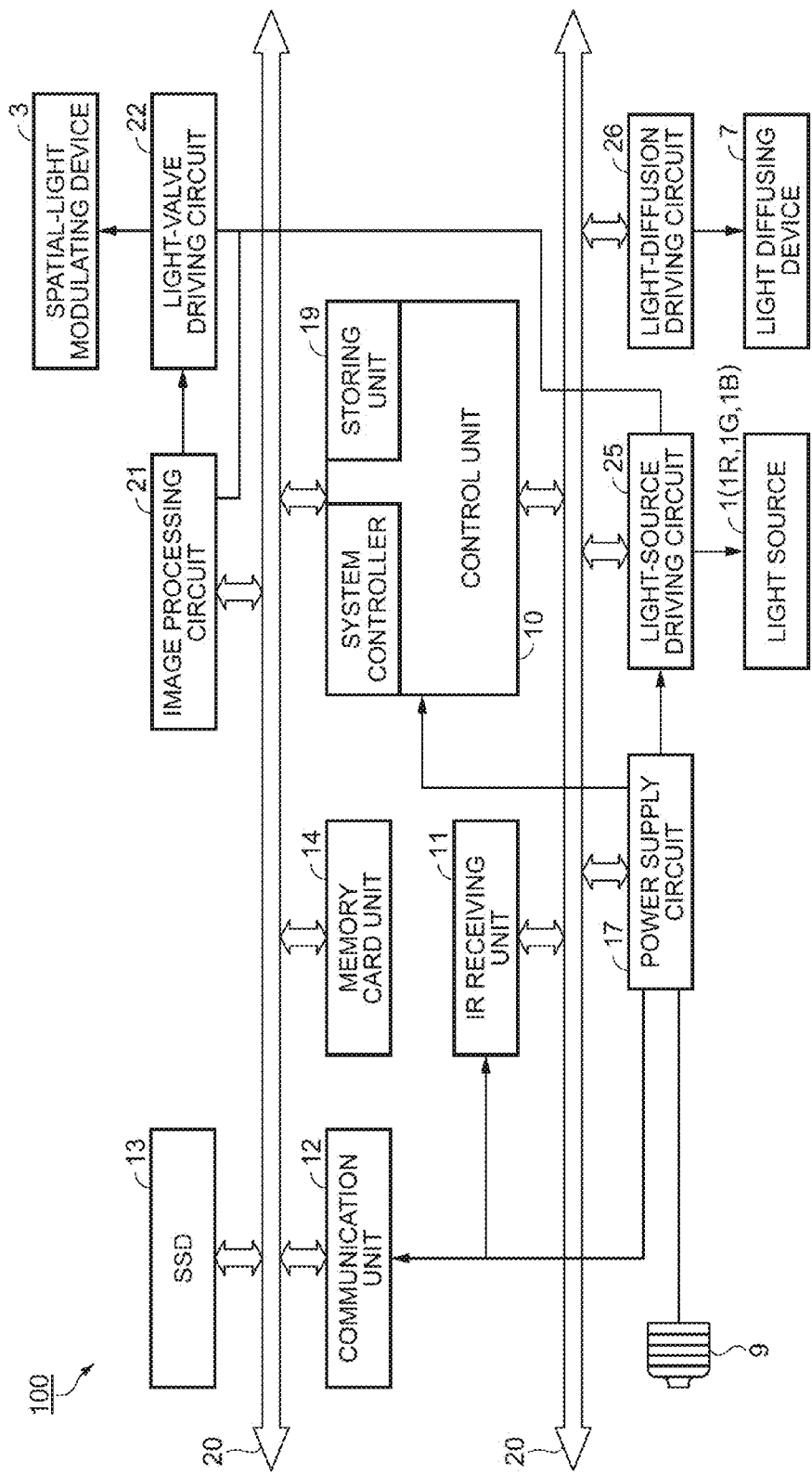
FIG. 7 is a block diagram showing a form of a specific hardware configuration.

In this embodiment, when the projector 100 is in the illumination mode, since the RGB light sources 1R, 1G, and 1B are driven in the high-speed mode, color breakup is less easily sensed than in the case of the projection mode. In the case of the illumination mode, since time periods in which the R, G, and B LEDs can light (lighting possible periods) do not overlap, it is unnecessary to redundantly provide the same circuits in a light-source driving circuit 25 (FIG. 7). Therefore, it is possible to simplify a circuit configuration. As in the case of the projection mode, since the RGB sequential driving is performed, it is possible to simplify driving control. That is, it is possible to prevent a cost increase in providing the projector 100 that functions as lighting equipment as well.

In FIG. 6B, an image (image data) for illumination projection is written in the spatial-light modulating device 3 in conjunction with the driving of the RGB light sources 1R, 1G, and 1B in the high-speed mode. This image is an image represented by, for example, a uniform luminance distribution. The written image does not have to be particularly refreshed in the spatial-light modulating device 3 as shown in FIG. 6B but may be refreshed. When the written image is refreshed, the luminance distribution of the written image may involve a change with time. It is desirable to adjust timing for the refresh to any one of changes of the lighting possible periods of the respective RGB light sources 1R, 1G, and 1B because a visual beat less easily occurs. However, the frequency of the refresh is desirably lower. This is because power consumption is smaller. Therefore, for example, it is conceivable that the written image is refreshed at a frequency lower than the repetition frequency of the RGB light sources 1R, 1G, and 1B.

However, when the spatial-light modulating device 3 includes a liquid crystal light valve of normally white (parallel Nicols), respective pixel regions of the spatial-light modulating device 3 transmit light even if an image (image data) is not written. Therefore, in this case, when the RGB light sources 1R, 1G, and 1B are driven in the high-speed mode, the display controller 4 does not have to write an image in the spatial-light modulating device 3.

A color of light projected in the case of the high-speed mode can be changed by changing a light emission intensity ratio among the RGB light sources 1R, 1G, and 1B. The color of the light can also be changed by changing pulse width (lighting period width) in the lighting possible periods of the respective RGB light sources 1R, 1G, and 1B.

Specific Hardware Configuration

FIG. 7 is a block diagram showing a form of a specific hardware configuration.

The projector 100 is explained from the viewpoint of a more specific hardware configuration with reference to FIG. 7. The components already explained above are denoted by the same reference numerals and signs in the figure and explanation of the components is sometimes omitted.

The projector 100 includes a bus 20, an image processing circuit 21 configured to apply resolution conversion, color correction, and trapezoidal correction to a source image, a light-valve driving circuit 22 configured to give a driving signal to the spatial-light modulating device 3 on the basis of the image processed by the image processing circuit 21, the control unit 10, the power supply circuit 17 electrically connected to the connecting unit 9, a light-source driving circuit 25 configured to give driving signals to the RGB light sources 1R, 1G, and 1B, a light-diffusion driving circuit 26 configured to give a driving signal to the light diffusing device 7, and the IR receiving unit 11 configured to receive an infrared command from a remote controller. These components can communicate via the bus 20 under the control by the control unit 10.

The light source controller 2 explained above is realized by the control unit 10 and the light-source driving circuit 25. The display controller 4 is realized by the control unit 10, the image processing circuit 21, and the light-valve driving circuit 22. The light diffusion controller 8 is realized by the control unit 10 and the light-diffusion driving circuit 26. The function of the communication unit is realized by the control unit 10 and the communication unit 12 configured by the wireless LAN adapter. The configurations of these units are not limited to the hardware configuration in this embodiment and could include other equivalent configurations that exhibit the same functions. The units can also be respectively realized by dedicated hardware components.

"Illumination Mode" and "Projection Mode"

According to a broadest definition, the "illumination mode" refers to a state in which the projector 100 functions as lighting equipment and exhibits a function of providing "light" indoors or outdoors. For example, the "illumination mode" is a state in which the projector 100 is projecting an image for illumination projection on a projection surface. The "illumination mode" is also defined as a state in which the light diffusing device 7 is in the diffusing state. Alternatively, the "illumination mode" may be defined as a state in which the RGB light sources 1R, 1G, and 1B are driven in the high-speed mode.

The "illumination mode" only has to be a mode in which at least one of the three conditions explained above is satisfied. Therefore, in some case, even if the projector 100 is projecting a picture, a photograph, a moving image, or a computer screen, if the light diffusing device 7 is in the diffusing state or the RGB light sources 1R, 1G, and 1B are driven in the high-speed mode, the projector 100 is referred to as being in the "illumination mode".

According to a broadest definition, the "projection mode" refers to a state in which the projector 100 is projecting some image. The "projection mode" is also defined as a state in which the light diffusing device 7 is in the non-diffusing state. Alternatively, the "projection mode" may be defined as a state in which the RGB light sources 1R, 1G, and 1B are driven in the normal mode. An intermediate diffusion state of the light diffusing device 7 may be included in the projection mode.

As explained above, with the projector 100 and the control method for the projector 100 according to this embodiment, effects explained below can be obtained.

With the projector 100, for example, by mounting the connecting unit 9 to a socket for illumination set in an entrance hall of an ordinary home, it is possible to easily attach a projector that can function as lighting equipment as well.

The projector 100 includes the communication unit configured to receive a mail (predetermined information). The projector 100 can update an image signal and adjust a diffusion degree of modulated light by the light diffusing device 7 on the basis of contents of the mail received by the communication unit. Specifically, the projector 100 sets the diffusion degree to be lower than the diffusion degree in the illumination mode for performing lighting for illumination and to be substantially zero.

Therefore, for example, when a user desires to inform family members who will return home that the user suddenly has to go out, if the user transmits in advance, to the projector, a mail including a message for a family member who returns home, the family member who returns home turns on an illumination switch at the entrance, whereby the projector can start up, perform the illuminating function, and clearly project and display the message.

Therefore, it is possible to effectively utilize the illuminating function for illuminating the entrance hall and the projecting function for displaying the message. In other words, it is possible to provide the projector 100 that can effectively utilize the illuminating function and the projecting function and has high versatility.

Further, when the illumination mode is switched to the projection mode, since the brightness and the color tone of illumination change, it is possible to cause the user to physically (visually) recognize the presence of the message. Therefore, a degree of attention to the message increases and the message can be surely conveyed. Even in the projection mode, since illuminance sufficient for visually recognizing an object around the user at night is secured, when the message is projected, the projector 100 can perform a sufficient function of the lighting equipment.

It is possible to easily create setting data of a mail (predetermined information) for operation instruction by inputting the setting data in a dedicated mail form using a GUI in a PC or a smart phone installed with a dedicated application program. Therefore, it is possible to conveniently use the projector 100.

The projector 100 can also be easily operated by using a not-shown remote controller. As operation buttons of the remote controller, a switching button for the illumination mode and the projection mode, an operation button for each of a plurality of illumination patterns set for each of usage scenes such as an illumination pattern for a party and an illumination pattern for relaxation, and the like are provided. Therefore, it is possible to provide the projector 100 that is easy to use and has high versatility.

Second Embodiment

Figure 8:
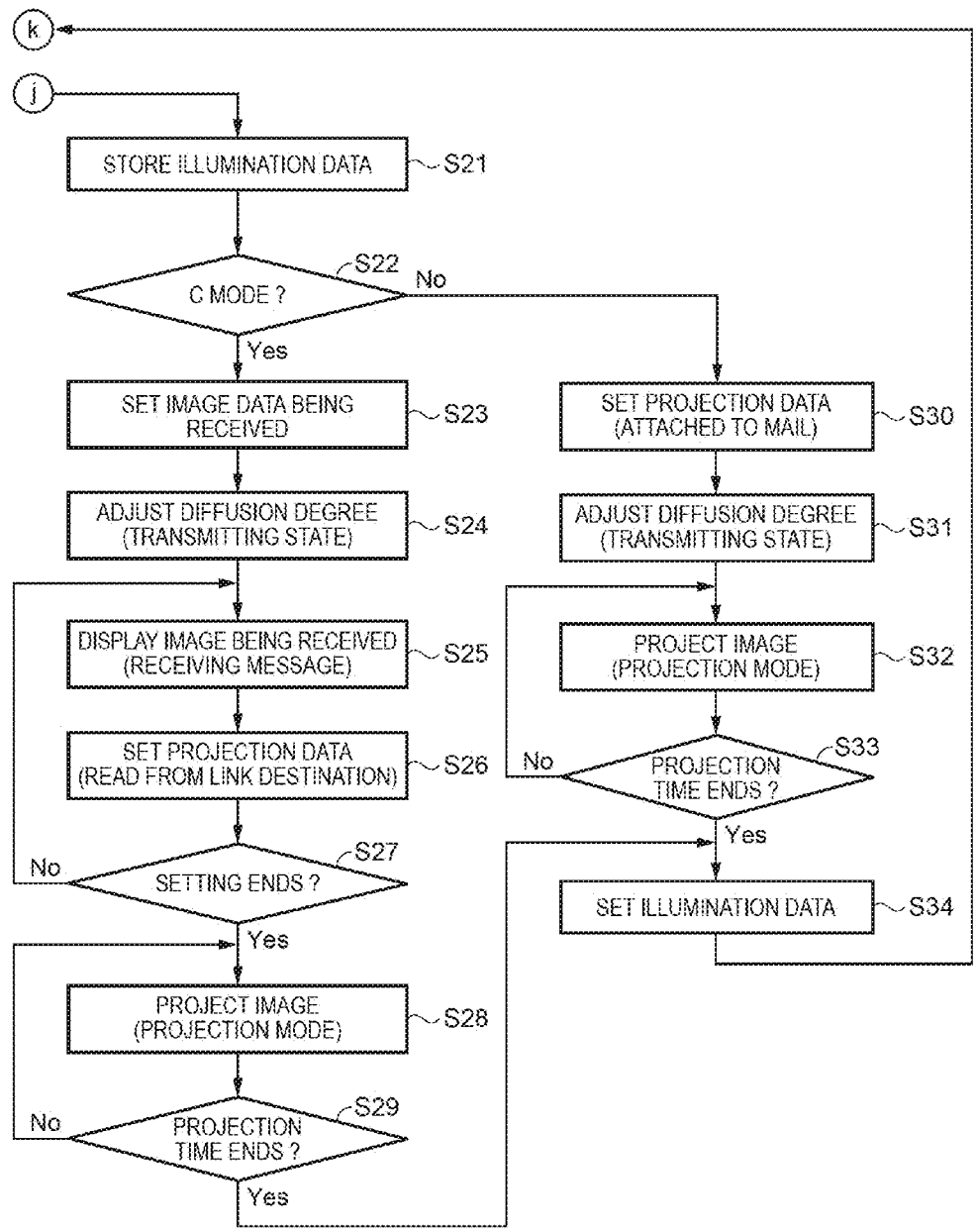
FIG. 8 is a flowchart for explaining a flow of a control method according to a second embodiment.

FIG. 8 is a flowchart for explaining a flow of a control method according to a second embodiment. The second embodiment is different from the first embodiment in a part of the control method for the projector 100. The configuration of the projector 100 is the same as the configuration in the first embodiment. In the control method according to this embodiment, a part of the control method according to the first embodiment (FIG. 4) is changed. Therefore, redundant explanation concerning common processing operations and the like is omitted. As in the first embodiment, an operation flow shown in FIG. 8 is executed by the control unit 10 controlling the units of the projector 100 including the communication unit 12 on the basis of the driving program stored in the storing unit 19.

The control method according to this embodiment is effective for timely informing a user that a message (content) is received when it takes time to read data, for example, when it is desired to display a message of a moving image in the projection mode. The control method makes it possible to project "receiving a mail (data)" by adding determination processing for presence or absence of application of the "C mode" to the basic operation flow shown in FIG. 4 making use of the identifier of the "C mode" explained with reference to FIGS. 5A and 5B. The "C mode" is enabled when "1" is designated. Processing for timely projecting an indication that a received mail is present is performed in the projection mode. When normal processing speed is acceptable, for example, when a text message is mainly displayed, "0" is designated.

First, the control method according to this embodiment includes steps S1 to S7 of the flowchart of FIG. 4 as a base (in common). However, the control method is different in a routine from a branch (j) on the No side in step S6 to a branch (k) for returning to step S4. In other words, in the control method according to this embodiment, the processing in steps S8 to S13 in FIG. 4 is replaced with processing in steps S21 to S34 in FIG. 8. Therefore, explanation of the common parts is omitted and the processing in steps S21 to S34 in FIG. 8 is explained.

In step S21, the control unit 10 stores setting data for illumination being executed (same as step S8 in FIG. 4).

In step S22, the control unit 10 determines whether "1" is designated to enable the C mode in the setting data of the received mail. When the C mode is enabled (Yes in S22), the control unit 10 proceeds to step S23. When the C mode is not enabled (No in S22), the control unit 10 proceeds to step S30.

In step S23, the control unit 10 sets, in the units, setting data including image signal data for displaying "receiving a mail (data)". The setting data set when the C mode is enabled is stored in advance in the storing unit 19 as standard data.

In step S24, the control unit 10 adjusts the light diffusion degree of the light diffusing device 7 to the projection mode. Specifically, the control unit 10 adjusts the diffusion degree to be substantially zero.

In step S25, the control unit 10 executes projection specified in the setting data set when the C mode is enabled.

Specifically, "Receiving a message. Please wait for a while." is displayed with black characters in white light illumination. Display content is not limited to this sentence and only has to be a sentence or an image that can cause the user to recognize that the projector 100 is "receiving a message". For example, an image of a sand glass may be used.

In step S26, the control unit 10 reads image data (content) attached to the received mail and sets projection setting data. The control unit 10 accesses image data at a link destination (URL) designated by the received mail and performs streaming setting.

In step S27, the control unit 10 determines whether projection setting (preparation) ends. When the projection setting ends (Yes in S27), the control unit 10 proceeds to step S28. When the projection setting does not end (No in S27), the control unit 10 returns to step S25 and continues the projection of "receiving a message".

In step S28, the control unit 10 performs projection of the image data attached to the received mail. Alternatively, the control unit 10 performs streaming projection of the image data at the designated link destination (URL).

In step S29, the control unit 10 determines whether a projection time designated by the setting data of the received mail ends. When the projection time ends (Yes in S29), the control unit 10 proceeds to step S34. When the projection time does not end (No in S29), the control unit 10 returns to step S28 and continues the projection.

In step S30, the control unit 10 sets the setting data designated by the received mail in the units (same as step S9 in FIG. 4).

In step S31, the control unit 10 adjusts the light diffusion degree of the light diffusing device 7 to the projection mode (same as step S10 in FIG. 4).

In step S32, the control unit 10 executes projection specified by the setting data of the received mail (same as step S11 in FIG. 4).

In step S33, the control unit 10 determines whether the projection time designated by the setting data of the received mail ends. When the projection time ends (Yes in S33), the control unit 10 proceeds to step S34. When the projection time does not end (No in S33), the control unit 10 returns to step S32 (same as step S12 in FIG. 4).

In step S34, the control unit 10 sets the setting data for illumination stored in step S21 in the units again (same as step S13 in FIG. 4). After setting the setting data again, the control unit 10 returns to step S4 (a branch k) in FIG. 4.

Contents of a Received Mail

Figure 9:
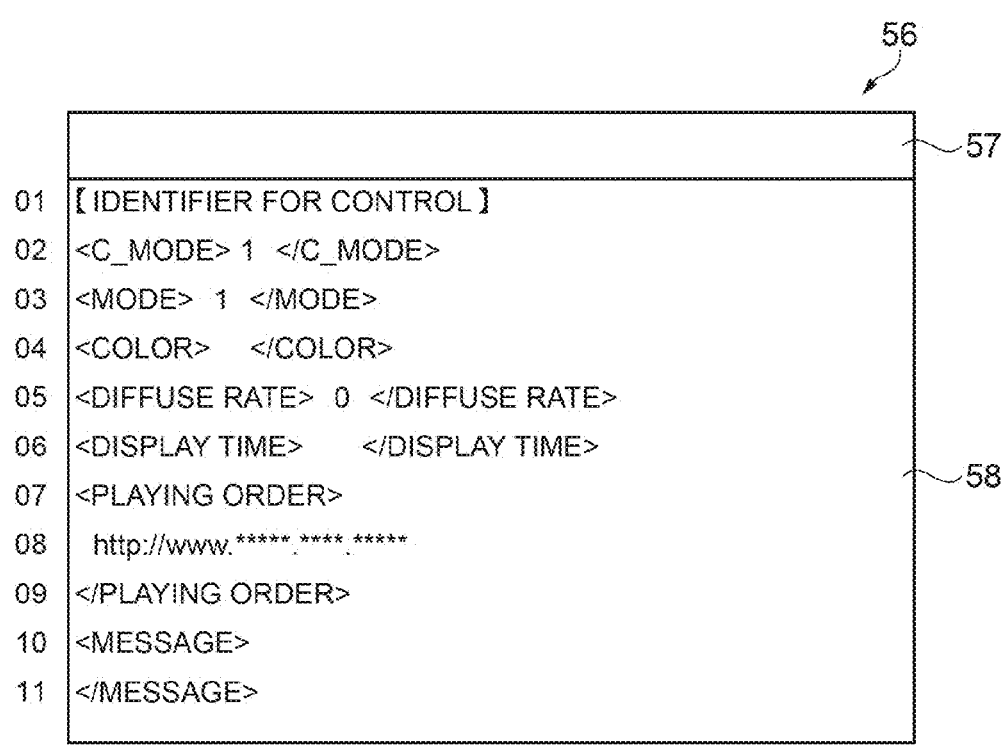
FIG. 9 is a diagram showing an example of a mail for operation instruction.

FIG. 9 is an example of an operation instruction mail of the projector 100 and corresponds to FIGS. 5A and 5B. A mail 56, which is an example of an operation instruction mail that enables the C mode, is explained. The mail 56 is configured by a header 57 and content 58. A basic configuration of a mail, an identifier, a type of data, and the like are the same as those in the explanation in FIGS. 5A and 5B. Therefore, only differences are explained.

First, in a second row of the content 58, the C mode is enabled by designating "1". Consequently, processing for immediately projecting a provisional message for informing that a received mail is present is performed. In a third row, the projection mode "1" is designated.

Illumination color data in a fourth row is a blank (a space). This designates that the provisional message is projected on the basis of the standard data stored in the storing unit 19 and that image data of the received mail is projected according to setting of the image data.

In diffusion degree data in a fifth row, "0" is designated and a diffusion degree is set to substantially zero. A display time in a sixth row is a blank (a space). When the image data is a moving image, the display time indicates time until reproduction of the moving image ends once.

In seventh to ninth rows, content (a play list) desired to be projected as a message is designated. Specifically, "http://www.***..****" described in the eighth row is a URL for link to the image data (content). Consequently, a moving image or the like at a link destination (URL) is accessed and projection by streaming is executed.

Referring back to FIG. 8, in the flow of FIG. 8, it is explained that the indication that a message is being read is projected when the identifier of the C mode is enabled. However, the identifier of the C mode does not have to be used. For example, when a message is included in a mail or in the case of the projection mode, the message reading indication may be displayed for all relevant mails. In this case, step S22 and steps S30 to 33 are unnecessary. When the message is included or in the case of the projection mode, the message reading indication is inserted in all messages. In the case of a light message including only a text, an indication that the message is being read in a short time is inserted in the message and the illumination mode is immediately switched to projection of the message. Although this is unpleasant for sight, a sense of discomfort is reduced by, for example, setting the message reading indication to be displayed at least for two seconds.

As explained above, with the control method for the projector 100 according to this embodiment, in addition to the effects in the first embodiment, effects explained below can be obtained.

With this control method, when a message (content) is included in a received mail, before the message is projected, "Receiving a message. Please wait for a while." is projected. Therefore, for example, when moving image is read from a link destination, even if it takes time to read the message, first, it is possible to surely inform that the message is present.

If the identifier of the C mode is used, the user can select whether the message receiving indication is displayed. Therefore, it is possible to effectively utilize the projector 100 according to message contents. Therefore, it is possible to provide the projector 100 that is easy to use and can surely convey a message.

The present invention is not limited to the embodiments explained above. Various changes, improvements, and the like can be made to the embodiments. Modifications are explained below.

Modification 1

Figure 10A:
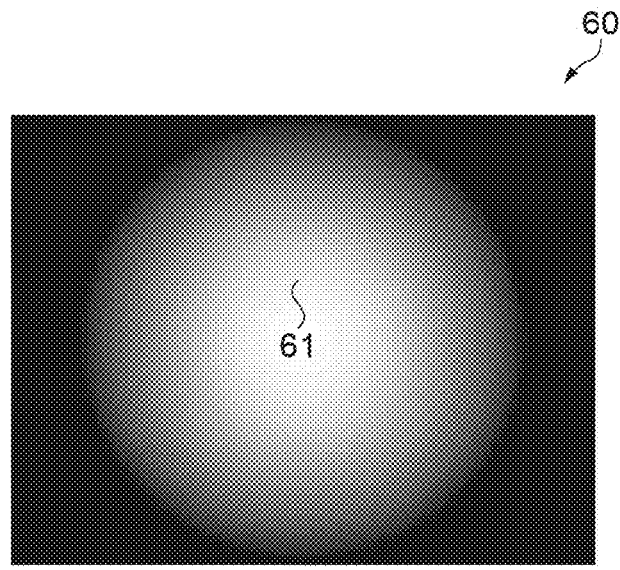
FIGS. 10A and 10B are diagrams showing forms of images in an illumination mode.
Figure 10B:
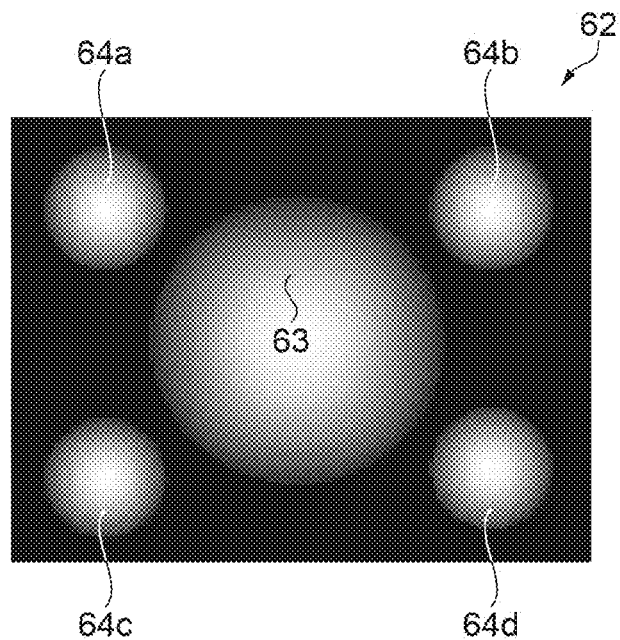

FIGS. 10A and 10B are diagrams showing forms of images in the illumination mode.

In the embodiments, as an example of the image signal in the illumination mode, the image signal specifying the plain image is explained. However, an image is not limited to this configuration. Various images (hereinafter, "illumination images") can be used.

For example, like an illumination image 60 shown in FIG. 10A, the image may be an image in which a plurality of circles having different tones are concentrically arranged in the center of an external shape (substantially coinciding with the display surface of the spatial-light modulating device 3) of an image formed in a laterally long rectangular shape. Specifically, a circle 61 in the center has the highest tone (white: 255 tone), the tone gradually decreases toward the outer side, and the tone is the lowest (black: 0 tone) in the peripheral edge of the rectangular shape (hereinafter referred to as "concentric image"). In other words, the circle 61 in the center is an image having a gradation of tones.

Like an illumination image 62 shown in FIG. 10B, the image may be an image in which a plurality of concentric images are arranged. Specifically, a concentric image smaller than the concentric circle shown in FIG. 10A is arranged in the center and, on the outer side of the concentric circle, four smaller concentric circles 64a to 64d are evenly arranged in directions of 2 o'clock, 4 o'clock, 8 o'clock, and 10 o'clock clockwise. The illumination image is not limited to a still image and may be a moving image. For example, the illumination image may be a moving image in which the size of a concentric image in the center is periodically changed or a moving image in which four concentric images arranged around the concentric image in the center slowly revolve around the concentric image in the center like satellites.

By using these illumination images in the illumination mode, it is possible to perform illumination of a gradation gradually darkening from the circle 61 in the center even if the light diffusing device 7 is not used. In other words, it is possible to adjust a diffusion degree of illumination according to an image signal even if the light diffusing device 7 is not used. Further, if these illumination images and the light diffusing device 7 are combined, it is possible to realize more expressive illumination.

Modification 2

Figure 11A:
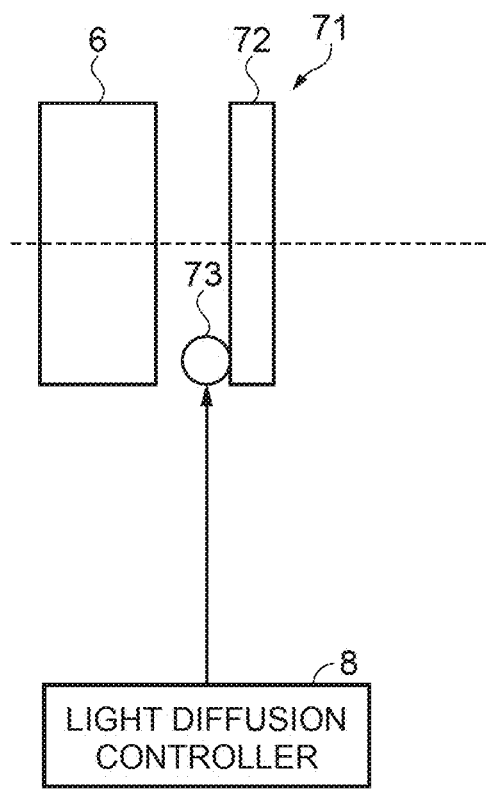
FIGS. 11A and 11B are diagrams showing different forms of a light diffusing device.
Figure 11B:
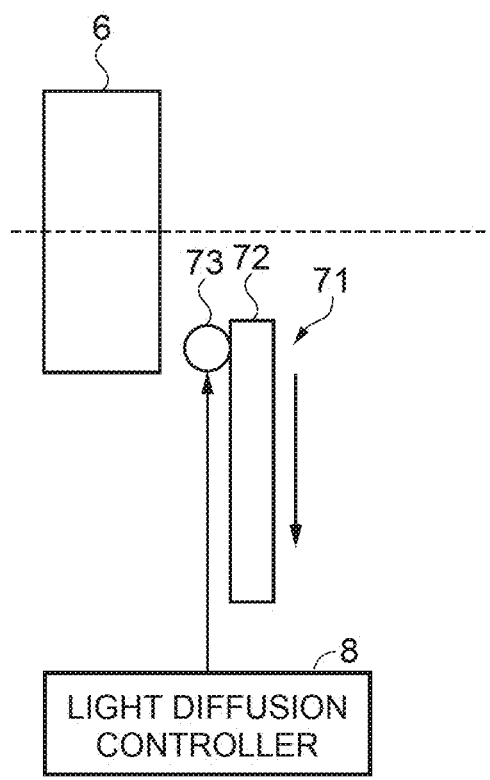

FIGS. 11A and 11B are diagrams showing different forms of a light diffusing device. The light diffusing device 7 shown in FIG. 2 may be, besides the PDLC device, a device that makes use of a diffuser or a device that makes use of a lens for adjusting a focus or may be a combination of these three devices. A light diffusing device 71 in a modification 2 performs adjustment of a diffusion degree using a diffuser 72 as shown in FIG. 11A.

Specifically, when the diffuser 72 is used, the light diffusing device 71 includes the diffuser 72 configured to diffuse and transmit light and a mechanical mechanism 73 configured to insert the diffuser 72 into an optical path of the projector 100 and remove the diffuser 72 from the optical path by sliding the diffuser 72. A position where the diffuser 72 is inserted may be any position on the optical path and may be a position on the optical path between the spatial-light modulating device 3 and the RGB light sources 1R, 1G, and 1B. The same holds true in the case of the reverse mode PDLC device and the case of the PDLC device. That is, the light diffusing device 71 may diffuse any of light made incident on the spatial-light modulating device 3 and light emitted from the spatial-light modulating device 3. However, a position further on the outer side than a projection lens on the outermost side is desirable because lights from the RGB light sources 1R, 1G, and 1B can be efficiently used in the case of the illumination mode.

The diffuser 72 may have the shape of a wheel. In this case, the diffuser 72 may include a portion for diffusing light (a portion having a high diffusion degree), a portion for transmitting the light without substantially diffusing the light (a portion having a low diffusion degree), and a portion having an intermediate diffusion degree. The mechanism 73 rotates the wheel according to the control by the light diffusion controller 8, whereby any one of the three portions is located on the optical path of the projector 100.

When a lens for adjusting a focus (a focus lens) is used, the lens only has to be controlled to be focused on a projection surface in the projection mode and controlled to be defocused in the illumination mode.

Modification 3

A modification 3 is explained with reference to FIG. 2.

In the explanation in the embodiments explained above, the light source of the projector 100 is configured to sequentially drive the LED light sources of the respective colors RGB. However, the light source is not limited to this configuration. For example, a light source that emits white light may be used.

Specifically, as the white light source, a white LED or EL element is suitable. In the case of this configuration, the solid-state light source is arranged instead of the dichroic prism of the irradiation optical system 5. As the spatial-light modulating device 3, a single-panel transmissive color liquid crystal light valve including RGB color filters is used. As the white light source, discharge-type lamps such as a halogen lamp, a metal halide lamp, and a high-pressure mercury lamp may be used. With these configurations, the functions of the projector 100 can be obtained and, moreover, the configuration of the projector 100 is simplified because only one light source is used. Further, it is possible to simplify a lighting driving method (circuit) as well.

Modification 4

According to the embodiments, the spatial-light modulating device 3 is the single-panel transmissive liquid crystal light valve. However, the spatial-light modulating device 3 may include a reflective liquid crystal light valve or may include a digital mirror device (DMD). When the spatial-light modulating device 3 includes the reflective liquid crystal light valve, the digital mirror device, or other light valves, it is obvious for those skilled in the art how the irradiation optical system 5 and the projection optical system 6 should be modified.

Modification 5

In the explanation in the embodiments, when electric power is supplied to the projector 100 (the power SW is turned on), the projector 100 enters the "illumination mode". However, the projector 100 is not limited to this configuration. The projector 100 may start from the "projection mode". In the "projection mode", for example, even when a "totally black" image is projected, since illuminance sufficient for the user to check a situation around the user at night is secured, the projector 100 can perform the function of illumination. If an initial state is the "projection mode", it is possible to more timely perform message display.

Modification 6

With the projector 100, the light diffusing device 7 can periodically repeat transition between the diffusing state and the non-diffusing state. Such periodical repetition can be attractive production of illumination. When the light diffusing device 7 is diffusing light, the projector 100 projects an image for illumination projection. When the light diffusing device 7 is not substantially diffusing light, the projector 100 projects an image for image projection. Alternatively, even if the light diffusing device 7 is diffusing light or not, the projector 100 may project an image based on image data.

Modification 7

In the explanation in the embodiments, the projector 100 is set on the ceiling of the entrance hall. However, the projector 100 is not limited to this configuration. The projector 100 can be set in various places in the home. For example, the projector 100 may be set in a kitchen, a dining room, a living room, a study, or a bedroom. It is convenient to set the projector 100 on the ceiling of the kitchen because a recipe of cooking can also be projected in the projection mode. When the projector 100 is set in the living room, if the user desires to calm down the user's emotion, the user can obtain a relaxation effect by performing slowly-moving illumination using the illumination images shown in FIGS. 10A and 10B. The use of the projector 100 is not limited to uses in the home. The projector 100 may be used outdoors and can be used in various places, for example, in a train, in a vehicle such as a bus, and in a cabin of an airplane.

What is claimed is:

1. A projector comprising:
   a light source configured to emit light;
   a light modulating unit configured to convert the light emitted by the light source into modulated light specified by an image signal;
   a diffusion adjusting unit configured to adjust a diffusion degree of the light made incident on the light modulating unit or the light emitted from the light modulating unit;
   a communication unit configured to receive predetermined information via a communication network; and
   a control unit configured to update the image signal and control the adjustment of the diffusion degree by the diffusion adjusting unit on the basis of contents of the predetermined information received by the communication unit,
   wherein the control unit switches, on the basis of the contents of the predetermined information, an illumination mode for causing the diffusion adjusting unit to diffuse the light and a projection mode in which the diffusion degree is lower than the diffusion degree in the illumination mode.

2. The projector according to claim 1, wherein, when content for display is included in the received predetermined information, the control unit superimposes the content on the image signal and sets the diffusion degree to the projection mode.

3. The projector according to claim 2, wherein, when content is included in the received predetermined information, the control unit superimposes, on the image signal, an image indicating that the content is being read before performing superimposition of the content.

4. The projector according to claim 2, wherein, when a link to content is included in the predetermined information, the content is read from the link destination via the communication network.

5. The projector according to claim 1, further comprising a storing unit configured to store setting data including the image signal used in the illumination mode, wherein when electric power is supplied to the projector, the control unit causes, on the basis of the setting data, the light modulating unit to modulate the light emitted by the light source.

6. The projector according to claim 5, wherein the setting data includes the image signal including an image having a gradation of tones.

7. The projector according to claim 5, wherein the setting data includes, in addition to the image signal, at least one of diffusion degree data representing the diffusion degree of the diffusion adjusting unit, an identifier for designating the illumination mode or the projection mode, illumination color data designating an illumination color in the illumination mode, and time data designating duration of the illumination mode or the projection mode.

8. The projector according to claim 1, wherein the diffusion adjusting unit includes a PDLC device or a reverse mode PDLC device.

9. The projector according to claim 1, wherein the diffusion adjusting unit includes a focus adjusting lens or a diffuser configured to transmit and diffuse the light.

10. A control method for a projector including: a light source configured to emit light; a light modulating unit configured to convert the light emitted by the light source into modulated light specified by an image signal; a diffusion adjusting unit configured to adjust a diffusion degree of the light made incident on the light modulating unit or the light emitted from the light modulating unit; and a communication unit configured to receive predetermined information via a communication network,
    the control method comprising:
    allowing the communication unit to receive the predetermined information; and
    updating the image signal and controlling the adjustment of the diffusion degree by the diffusion adjusting unit on the basis of contents of the predetermined information received by the communication unit,
    wherein the control unit switches, on the basis of the contents of the predetermined information, an illumination mode for causing the diffusion adjusting unit to diffuse the light and a projection mode in which the diffusion degree is lower than the diffusion degree in the illumination mode.

* * * * *